United States Patent

Han

[11] Patent Number: 5,986,774
[45] Date of Patent: Nov. 16, 1999

[54] TRANSPARENCY ADAPTER FOR FLATBED SCANNER

[75] Inventor: Loi Han, Alhambra, Calif.

[73] Assignee: Microtek International, Inc., Hsinchu, Taiwan

[21] Appl. No.: 08/886,774

[22] Filed: Jul. 1, 1997

[51] Int. Cl.[6] .................................. H04N 1/04; H04N 1/46
[52] U.S. Cl. .................... 358/487; 358/475; 358/506; 358/509; 358/497
[58] Field of Search ..................................... 358/487, 506, 358/505, 474, 497, 408, 475, 509, 494, 401, 496; 250/208.1, 234–236; 399/220, 221, 206, 211, 377, 378, 379, 144, 177; 359/227, 894, 896; 362/800, 217, 260, 351, 355; H04N 1/04

[56] References Cited

U.S. PATENT DOCUMENTS

| 5,140,443 | 8/1992 | Iwahara et al. | 358/474 |
|---|---|---|---|
| 5,251,072 | 10/1993 | Fukuoka et al. | 358/487 |
| 5,381,245 | 1/1995 | Johnston et al. | 358/487 |
| 5,467,172 | 11/1995 | Liao | 358/487 |
| 5,535,021 | 7/1996 | Chiang | 358/474 |
| 5,652,665 | 7/1997 | Chen | 358/487 |
| 5,696,609 | 12/1997 | Cresens et al. | 358/475 |
| 5,764,382 | 6/1998 | Shiraishi | 358/496 |
| 5,798,849 | 8/1998 | Tsai | 358/475 |
| 5,801,851 | 9/1998 | Sheng | 358/497 |

*Primary Examiner*—Edward L. Coles
*Assistant Examiner*—Cheukfan Lee
*Attorney, Agent, or Firm*—Small Larkin, LLP

[57] ABSTRACT

A transparency adapter for a flat bed scanner of the type commonly used as a stand-alone computer peripheral, including a source of light, either white light such as fluorescent, or a series of red, green and blue light emitting diodes placed in a generally rectangular housing having a length corresponding to the width of the glass platen of a flat bed scanner, and including magnets at either longitudinal end of the transparency adapter, further including magnets positioned on the carriage inside of the flat bed scanner housing, whereby the magnets of the carriage are aligned with the magnets of the transparency adapter so that upon advancement of the carriage along the rails inside of the scanner from one end of the scanner to the other, the magnetic force of the attached magnets causes the transparency adapter to advance along the top surface of the glass platen and to move the transparency adapter in alignment with the carriage.

9 Claims, 7 Drawing Sheets

TRANSPARENCY ADAPTER FOR FLATBED SCANNER

BACKGROUND OF THE INVENTION

A. Field of the Invention

The present invention is directed to a transparency adapter for a flat bed scanner.

B. Description of the Prior Art

Transparency adapters for flat bed scanners are known. However, conventional transparency adapters include a separate carriage, rails, motor, platen, hinge-type cover and control software which, together, is of significant cost and complexity in relation to that of the scanner itself. Also, in use, it has been found that alignment problems due to use and misuse of the hinges for the transparency adapter have arisen.

OBJECTS AND SUMMARY OF THE INVENTION

It is an objective of the invention to provide a transparency adapter for a flat bed scanner that is magnetically coupled to the carriage inside of the housing of a conventional flat bed scanner.

It is a further objective of the present invention to provide an adapter for a flat bed scanner which does not require a separate carriage, separate rail, separate motor, separate platen and separate hinge cover.

It is a further objective of the present invention to provide a transparency adapter which is simple, and may conveniently be used with conventional, reflective scanner.

It is also an objective of the present invention to provide a transparency adapter having a magnetic shield.

It is a further objective of the present invention to provide a transparency adapter for use in a stand alone, flat bed scanner of the CIS type wherein the adapter is magnetically coupled to the carriage of the CIS scanner.

It is a further objective of the present invention to provide a transparency adapter which uses the flat bed scanner as its power source.

It is a further objective of the present invention to provide a transparency adapter having white light or color LED light sources.

It is a further objective of the present invention to provide a transparency adapter sized to conform to the dimensions of a 35 mm slide or film strip and to lie flat over the transparency on the glass platen of a conventional flat bed scanner.

The transparency adapter of the present invention includes a white light source, such as a fluorescent bulb, or a light emitting diode (LED) light source including red, green and blue LEDs arranged in a generally rectangular, transparency adapter positioned on top of the glass platen of a conventional flat bed scanner. The conventional flat bed scanner may be of the color, charge coupled device (CCD) type or of the contact image sensor (CIS) type. The transparency adapter includes, preferably, magnets positioned at each of the longitudinal ends of the transparency adapter and also includes corresponding magnets placed on or attached to the carriage within the flat bed scanner housing. The magnets are of sufficient strength and are positioned so that when the adapter magnets are directly opposite the carriage magnets, the light source of the transparency adapter is positioned directly above a slit in the carriage through which light normally passes in its path from the object scanned to the CCD. Alternatively, the magnets may be positioned such that the light source is directly above the lens of the CIS module in a CIS type scanner.

Alternatively, and providing that the magnets are of sufficient strength and that either the carriage or the transparency adapter is made of or includes a ferro-magnetic material, magnets may be needed in only the carriage or the transparency adapter, but not both. What is important is that the magnets used be of sufficient strength and the materials used be of a type so as to cause the transparency adapter to move along the top of the glass platen, through magnetic attraction, in response to movement of the carriage under the glass platen and inside of the scanner housing. In this way, a moving light source is positioned above the carriage as the carriage advances along its track and moves to provide a uniform, and aligned source of light for the object to be scanned.

In an alternate embodiment of the present invention, a transparency adapter, without magnets, is sized so as to provide uniform light over one or more 35 mm transparencies. In this fashion, the transparency adapter is placed on top of a 35 mm transparency, whether mounted or unmounted, which has been placed on the glass platen of a flat bed scanner. With the light source energized, the scanner is operated in its normal fashion, and the carriage advances from one end of the scanner to the other, and, when passing under the illuminated transparency adapter, receives an image in a conventional way. In this alternative embodiment of the invention, the diffuser of the transparency adapter is sized so as to be at least the same size as the transparency of the 35 mm film, and includes a reflector which is curved and positioned so as to provide an equal focal length for light emanating from the longitudinal centerline of the light source to all points on the diffuser surface opposite the 35 mm transparency.

Yet another embodiment of the present invention provides for a CIS module as a light source to be used in a transparency adapter for use in a CIS type scanner. In this embodiment of the invention, magnets are placed on either, or both, of the CIS modules used internal to the housing and on the CIS module used as the light source for the transparency adapter. The magnets are positioned so that the lenses of the CIS modules are aligned when the corresponding magnets are aligned.

DESCRIPTION OF THE PREFERRED EMBODIMENTS

Figure 1:
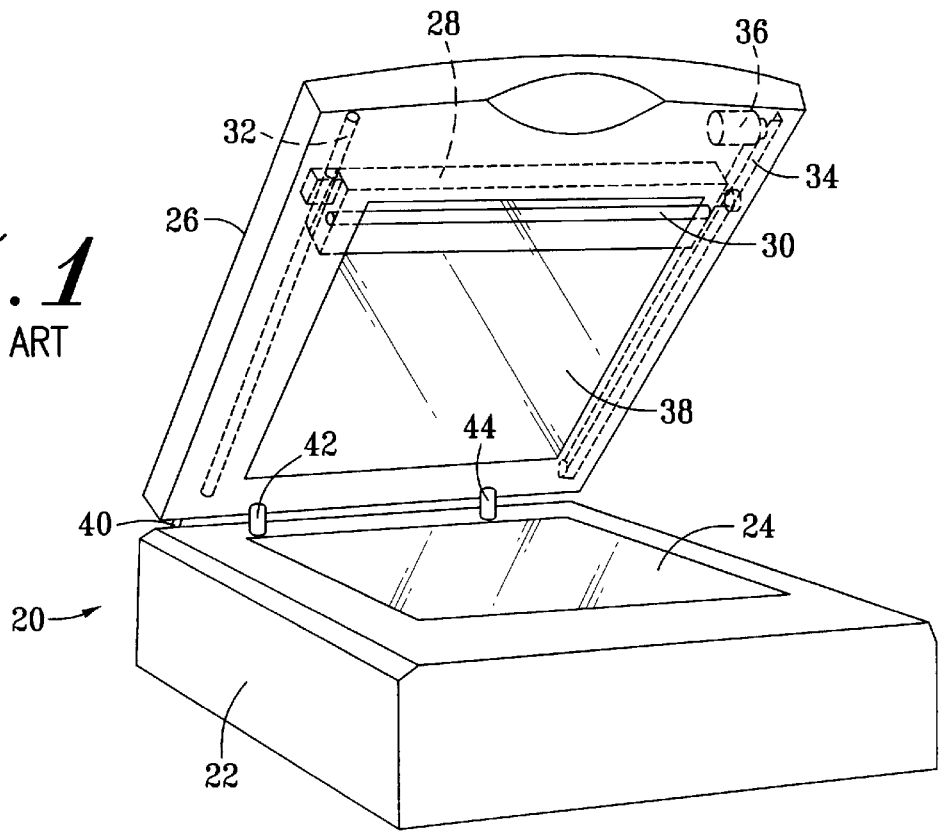
FIG. 1 is a front perspective view of a prior art flat bed scanner.

Referring to FIGS. 1–6, a first preferred embodiment of the present invention will be described. Shown in FIG. 1 is a prior art flat bed scanner with a conventional transparency adapter and illustrating those features which will facilitate an understanding of the present invention transparency adapter.

Prior art flat bed 20 includes a housing 22 with a glass platen 24 positioned on its top surface. Cover 26 includes a carriage 28, a light source 30, rails 32 (the left one of which is shown in FIG. 1, and right one of which, although not shown, is positioned parallel to rail 32 on the right side of the scanner cover 26). The cover 26 also includes an endless belt or chain 34, positioned adjacent to the second rail which is not shown. Endless belt 34 is powered by motor 36. Glass 38 is positioned on the inside of the cover. Power cord 40 provides power from a connection at the rear of the housing 22 of the flat bed scanner 20. The conventional transparency adapter, or cover 26, is positioned on the housing 22 with hinges 42 and 44, which are inserted into holes 46 and 48, as shown in FIG. 2.

Figure 2:
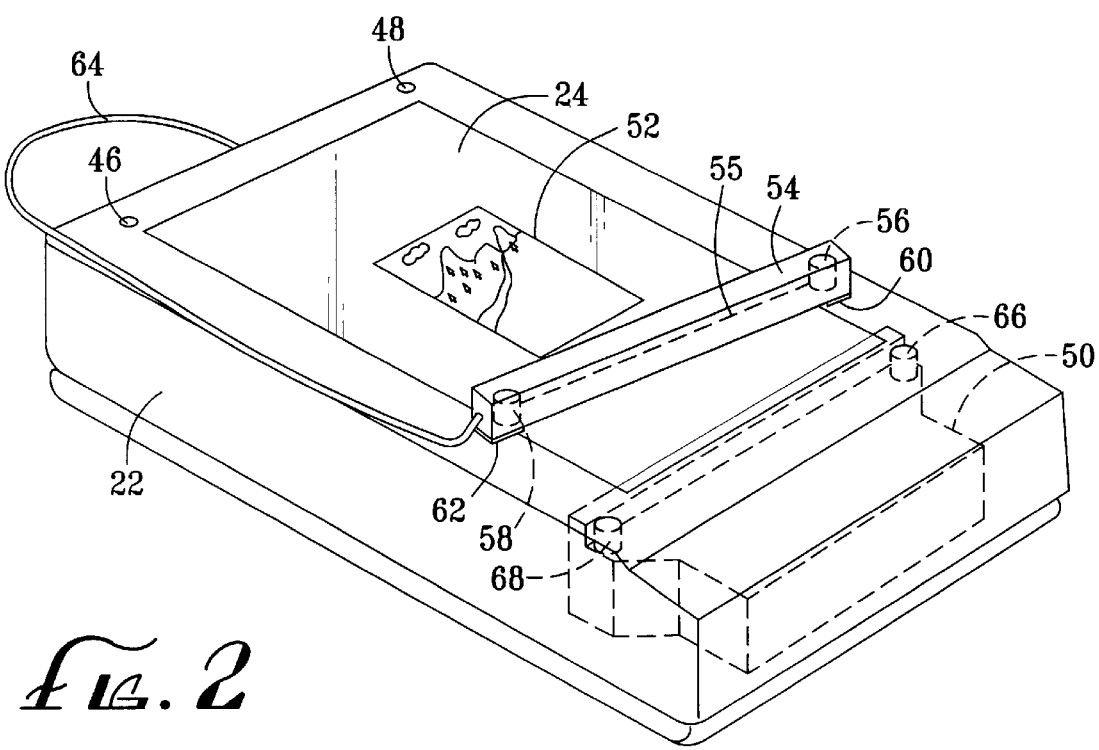
FIG. 2 is a side perspective view of a flat bed scanner showing a preferred embodiment of the transparency adapter of the present invention.

Referring to FIG. 2, the flat bed scanner 20, without the prior art adapter 26, is shown. The conventional carriage 50 is shown in dotted lines, and is positioned inside of the housing 22. On top of glass platen 24 is positioned a transparency 52. Also shown positioned above the glass platen 24 is a first preferred embodiment transparency adapter 54. The adapter 54 is generally of a rectangular configuration, and includes internal magnets 56 and 58 positioned at opposite longitudinal ends of the adapter. The adapter 54 also includes at its opposite, longitudinal ends pads 60 and 62. The transparency adapter 54 also includes, internally, a conventional fluorescent, or other white light source, not shown. Power for the light source is supplied via power cord 64 which connects to the conventional adapter at the rear of the housing 22 of the flat bed scanner 20, and provides AC power from a DC/AC converter included within the housing 22 of the scanner 20. Carriage 50 has been modified to include, preferably, magnets 66 and 68. The magnets 66 and 68 may be fastened to the carriage 50 in any conventional fashion, such as by glue or other conventional fasteners. The magnets 66 and 68 are positioned on the carriage 50 such that when the longitudinal centerline 55 the transparency adapter 54 is parallel to the line between magnets 66 and 68, the adapter 54 is centered over the glass platen 24, and the carriage magnets 66 and 68 are in vertical alignment with the transparency adapter magnets 56 and 58, respectively. As shown in FIG. 2, the transparency adapter 54 has been placed on the top surface of the scanner housing 22 in a position which is slightly out of alignment with the carriage at one end of the flat bed scanner. The adapter may be placed on top of the housing so that it is in alignment. In either case, the adapter is placed so that it is in position to begin scanning the object placed on the platen 24.

Figure 3:
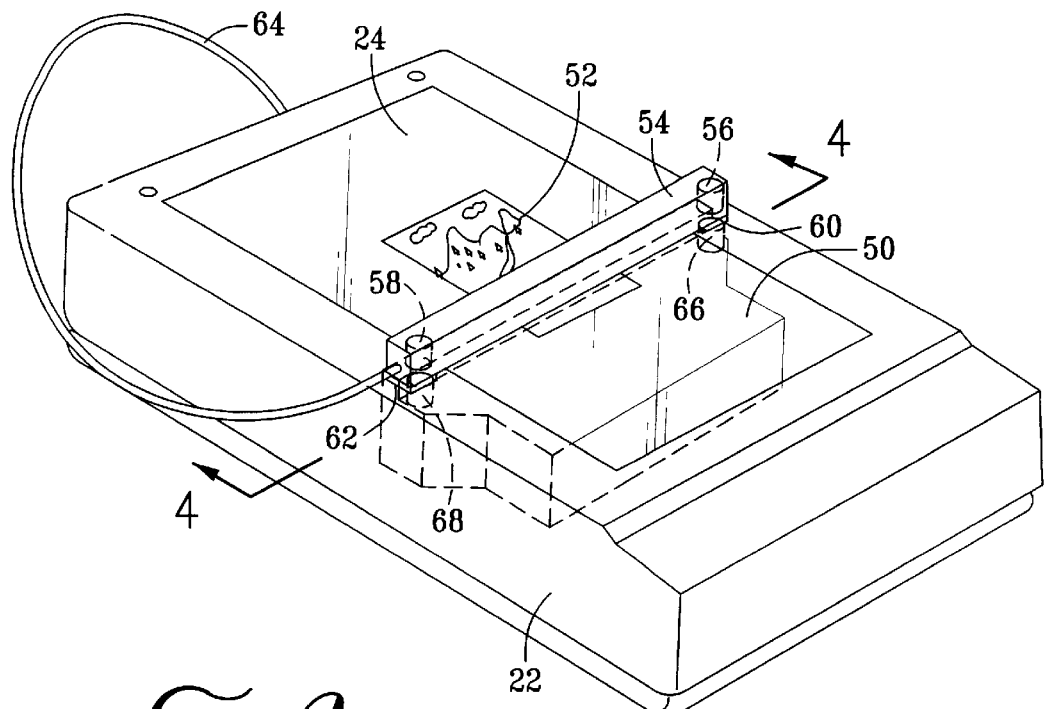
FIG. 3 is a side perspective view of the FIG. 2 embodiment and showing the transparency adapter after scanning has begun and the transparency adapter has been aligned.

Referring to FIG. 3, the scanner and transparency adapter of FIG. 2 is shown, but after the scanning process has begun. In FIG. 3, the carriage 50 has moved along the internal rails, not shown, within the housing 22, to a position which is underneath the transparency adapter 52. As may be seen by comparing FIG. 3 with FIG. 2, as the carriage 50 moves towards the opposite end of the housing 22, the magnets 60 and 68 cooperate with the magnets 56 and 58, respectively, to exert a strong attractive force and cause the adapter 54 to come into alignment with the carriage, In this way, the light transmitted from the light source internal to adapter 54 is maintained in alignment with the carriage 50 as it moves across the glass platen 24.

Pads 60 and 62 are made of a relatively smooth, slippery material such as, preferably, nylon. Alternatively, other materials which are relatively slippery, such as teflon or other plastic material may be used. Alternatively, rolling surfaces may also be used, as well as other alternative structures so long as they provide for capability of movement of the transparency adapter 54 in conjunction with and following the movement of carriage 50. The pads 60 and 62 are of a sufficient width, length and height to provide for smooth movement of the adapter 54 in conjunction with movement of the carriage 50. The surface area of the pads 60 and 62 is preferably about equal to the surface area of the bottom surface of the transparency adapter 54, underneath the magnets 56 and 58, respectively, and the surrounding surface area, but not overlying the glass platen 24. The height or thickness of the pads 60 and 62 must be thicker than the transparency placed on the platen 24, and preferably about ⅛ to ¼ inch in thickness.

Figure 4:
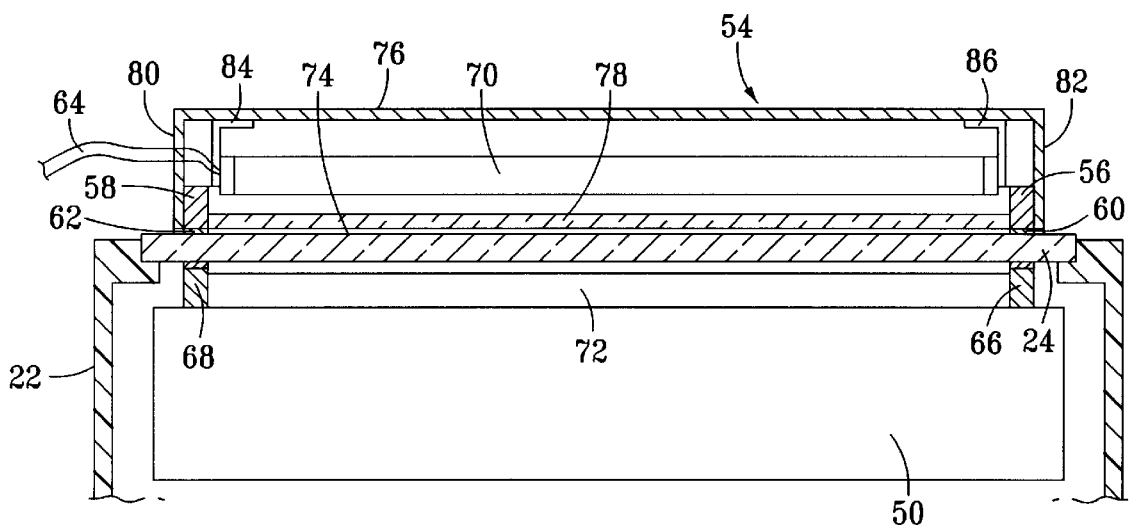
FIG. 4 is a is a cross-sectional view of the transparency adapter of the present invention taken along line 4—4 of FIG. 3.

Referring to FIG. 4, a cross-section view of the transparency adapter 54 and corresponding portions of the flat bed scanner is illustrated. The adapter 54 is shown positioned above platen 24, which in turn is positioned on the top of housing 22. The carriage 50 is shown with magnets 66 and 68 positioned thereupon. Scanner light source 72 is shown, although it is not used during transparency scanning with the transparency scanner 54 of the present invention. Inside of adapter 54, conventional, fluorescent light source 70 is positioned and fastened to brackets 84 and 86, respectively, and powered through power cord 64. The adapter magnets 56 and 58 are shown positioned directly above the carriage magnets 66 and 68, respectively. The adapter 54 includes a top wall 76 to which the brackets 84 and 86 are fastened in a conventional fashion. The adapter also includes left side wall 80 and right side wall 82. Diffuser 78 is positioned along the bottom of transparency adapter 54 and includes a conventional diffuser element, preferably of a frosted or white type of glass or plastic and which functions to diffuse light emanating from the light source 70. Pads 60 and 62 are also shown positioned at the bottom of transparency adapter 54, and aligned between the adapter magnets 56 and 58 and the carriage magnets 66 and 68, respectively.

At the bottom of the transparency adapter 54, below diffuser 78, and the top surface of the platen 24, gap 74 is provided to be of such a height so as to permit sliding movement of the transparency adapter 54 over the transparency and without touching the transparency. The height of the gap 74 is provided by and is equal to, preferably, the height of the pads 60 and 62.

Figure 5:
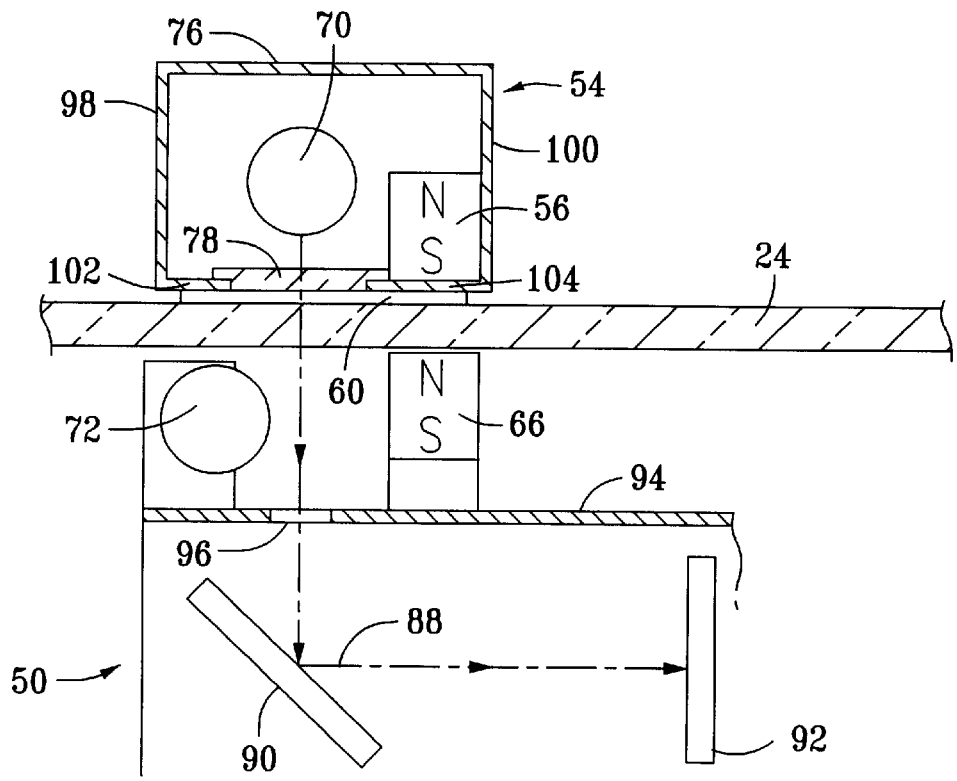
FIG. 5 is a cross-sectional view of the transparency adapter of FIG. 2 taken along a line perpendicular to line 4—4 of FIG. 3.

Referring to FIG. 5, a cross-sectional view of the transparency adapter 54 and carriage portion of the scanner as shown in FIG. 3, but in a view perpendicular to that shown in FIG. 4, the path of light from the light source 70 is shown. The light originates at light source 70, passes through diffuser 78, platen 24 and is reflected off of one or more mirrors 90 inside of the carriage 50 and into the CCD 92. The light path, shown with arrow 88, also passes through slit 96 in the top surface 94 of the carriage 50. This slit already exists in the conventional carriage and is the slit through which light reflected off of an opaque object from the light source 72 passes through the mirror(s) and lens to be focused onto the color CCD 92. Also shown in FIG. 5 is the transparency adapter magnet 56 and the carriage magnet 66. A first longitudinal wall 98 and a second longitudinal wall 100 are also shown in cross-sectional FIG. 5, as well as a first partial bottom wall 102 and second partial bottom wall 104. The pad 60 is also shown between the transparency adapter 54 and the glass platen 24.

Figure 6:
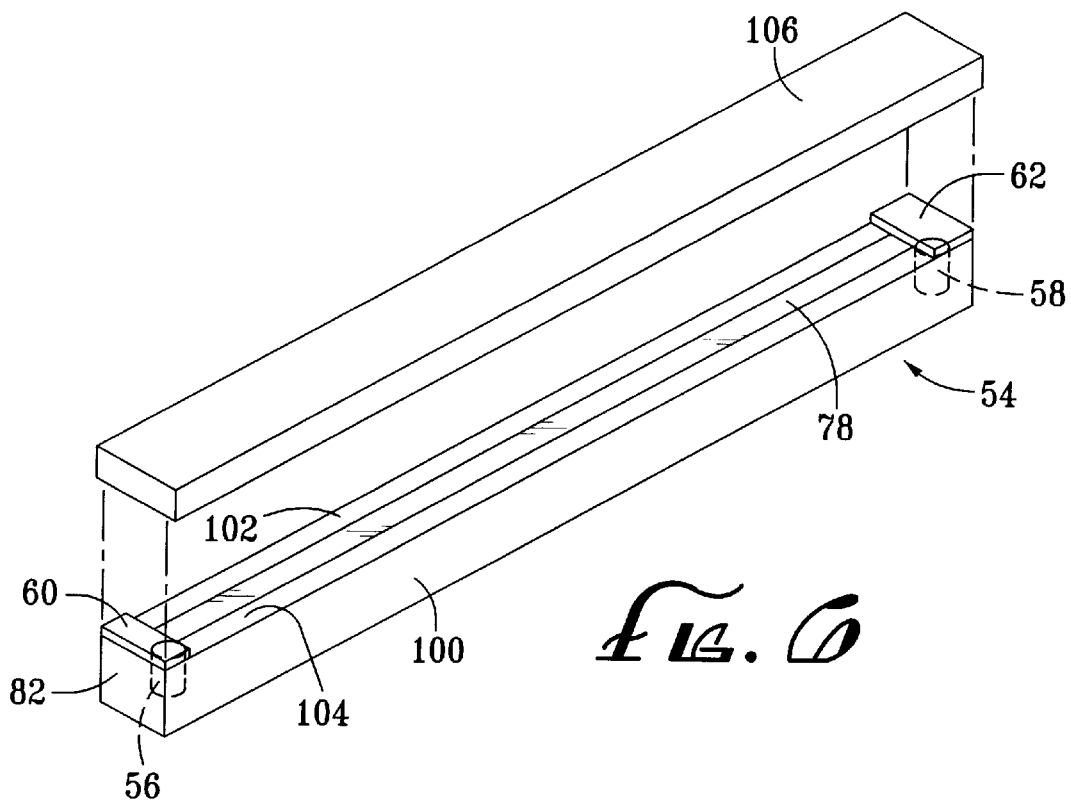
FIG. 6 is a side perspective view of the FIG. 2 transparency adapter including a magnetic shield.

Referring to FIG. 6, the transparency adapter 54 is shown with the diffuser 78, or bottom walls 102 and 104 facing upward. Magnetic shield 106, used during storage of the adapter, is shown configured to snap fit over the diffuser of the transparency adapter, when not in use, so as to provide magnetic shielding from the flux generated by magnets 56 and 58, located near the surface of the transparency adapter. The magnetic shield 106 may be made of any magnetic shield material, so long as it provides sufficient structural integrity and sufficient shielding of the magnetic field created by the magnets' positioned within the transparency adapter.

Figure 7:
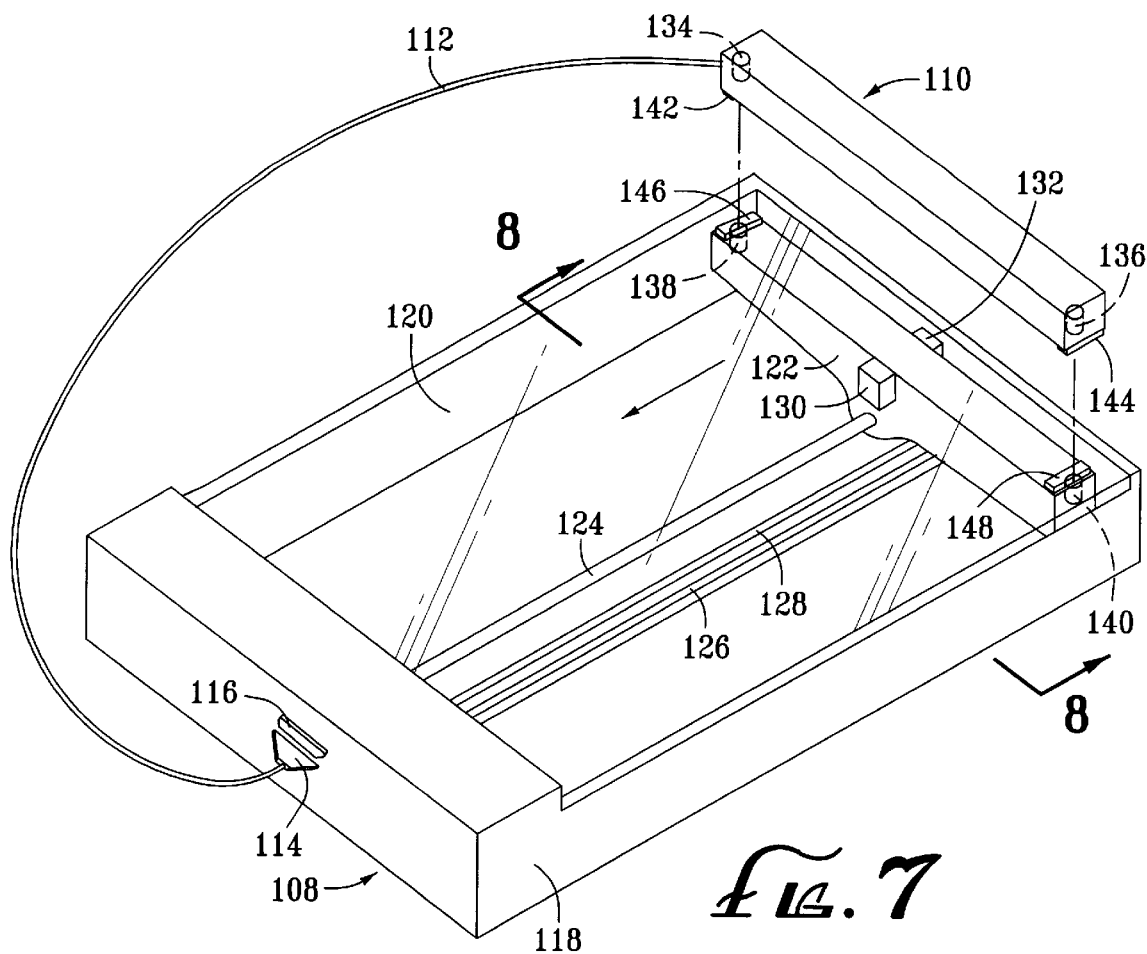
FIG. 7 is a side perspective view of an alternate embodiment of the present invention showing a flat bed scanner having a contact image sensor and a transparency adapter having a color light emitting diode light source.

Referring to FIGS. 7–10, an alternate embodiment of the present invention is disclosed wherein a stand-alone, flat bed scanner 108 of the contact image sensor (CIS) type using a transparency adapter 110 of the present invention is shown. Transparency adapter 110 is supplied power through power cord 112 at plug 114 and connection 116 in the housing 118 of the scanner. The scanner also includes platen 120 and an internal carriage 122. The carriage 122 is positioned on a monorail 124, and moves from one end of the scanner to the other through operation of an endless belt 126, one portion of the belt being identified as 126 and the return portion as 128. Electronic paper sensors 130 and 132 are also shown in FIG. 7. The transparency adapter 110 includes a first magnet 134 and a second magnet 136, each of which is located adjacent the longitudinal ends of the transparency adapter. Corresponding magnets 138 and 140 are positioned on the carriage 122 and at a distance from each other so that they will be aligned with magnets 134 and 136, respectively, of the transparency adapter 110, when the adapter 110 is placed on platen 120 and directly over the carriage 122. The transparency adapter 110 also includes pads 142 and 144 located at the longitudinal ends of the transparency adapter. As described above with respect to the first embodiment, these pads have a slippery or sliding surface so as to permit smooth and easy sliding of the transparency adapter 110 over the glass platen 120. The pads are also of a sufficient thickness, or height, so as to permit movement of the transparency adapter over a transparency, whether mounted, or unmounted so as not to touch the transparency as it is being scanned. Inside of the flat bed scanner housing 118 and on top of the carriage 120 are positioned pads 146 and 148, to prevent rotation of the carriage 122, and to provide a smooth, sliding surface for the carriage to move from one end of the platen to the other during operation. Further details of CIS type flat bed scanner is disclosed in co-pending application Ser. No. 08/843,622, entitled Contact Image Sensor Flat Bed Scanner, Filed Apr. 10, 1997, which is incorporated by reference herein.

Figure 8:
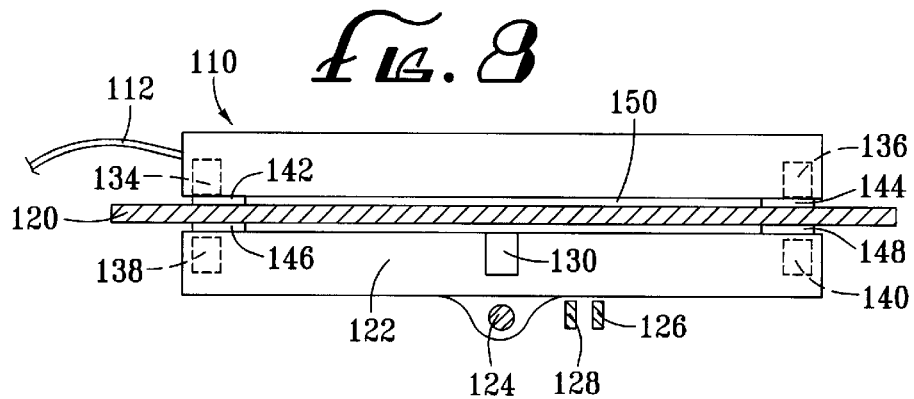
FIG. 8 is a cross-sectional view of the FIG. 7 embodiment taken along line 8—8.

Referring to FIG. 8, the second embodiment transparency adapter 110 is shown positioned over the platen 120, and wherein the pads 142 and 144 provide for a gap 150 between the bottom surface of the adapter 110 and the top surface of the platen 120.

Figure 9:
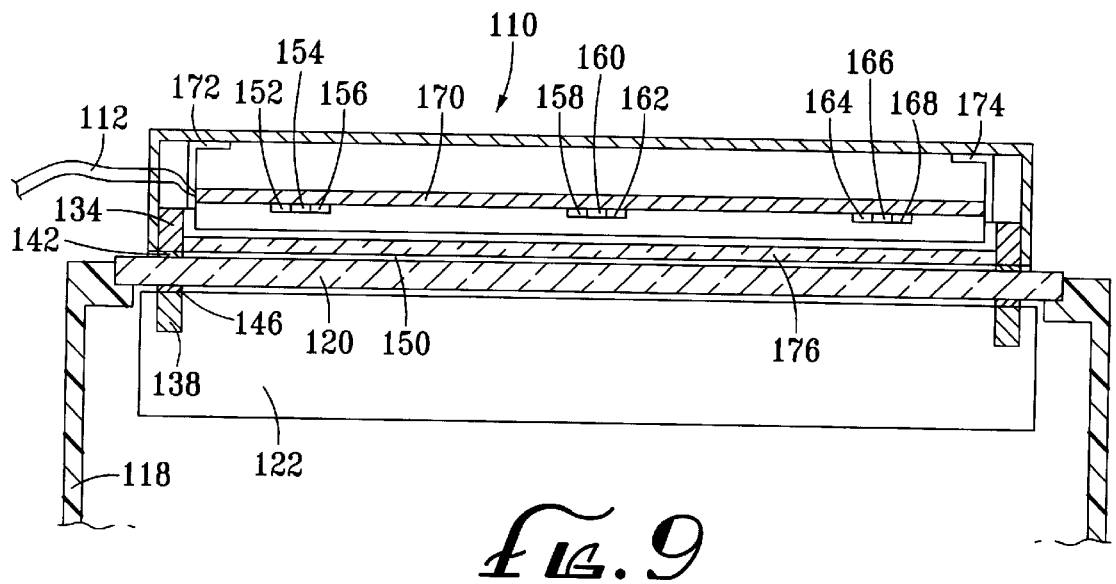
FIG. 9 is a cross-sectional view of the FIG. 7 embodiment taken along a line parallel to line 8—8, but through the longitudinal centerline of the transparency adapter.
Figure 10:
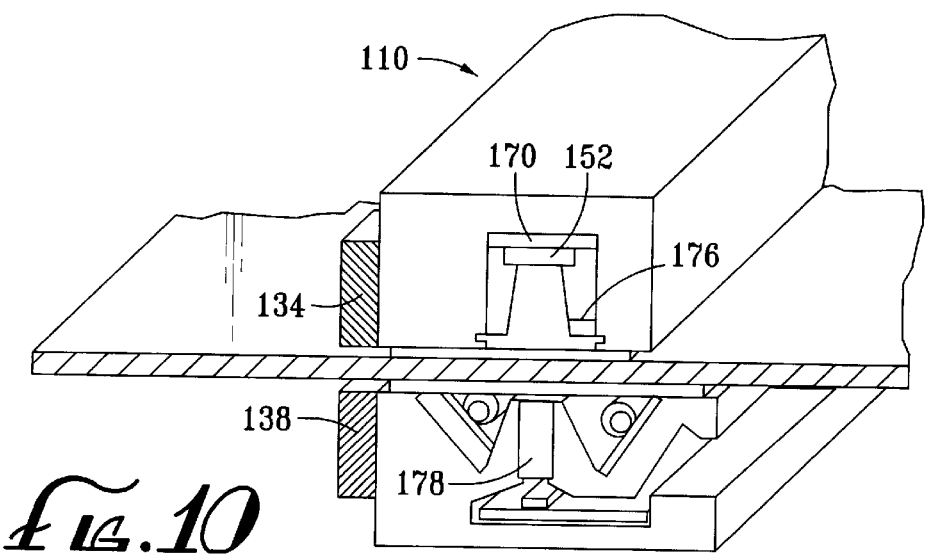
FIG. 10 is a cross-sectional view of the FIG. 7 embodiment taken in a line perpendicular to line 8—8 of FIG. 7.

Referring to FIGS. 9 and 10, the transparency adapter light source is a conventional LED light source including at least one each of a red (R), green (G) and blue (B) light emitting diode (LED), but preferably a plurality RGB LEDs. Shown in FIG. 9, three sets of RGB diode clusters are positioned along the length of the transparency adapter 110. The first cluster includes LEDs 152, 154 and 156 which are R, G and B, respectively. Corresponding LEDs 158, 160 and 162 form a second RGB triplet and LEDs 164, 166 and 168 form the third RGB triplet. The total number of LEDs used to provide the light source is optional. In general, the more LED light sources provided, the more even the distribution of light along the length of the adapter, and the greater light intensity available. However, as the number of LEDs increases, the cost increases, and it is therefore, a matter of judgment concerning how many LEDs to use and how to position them. The three LED clusters are shown positioned on arm or support member 170, which extends lengthwise through the interior of the adapter 110, and between side bracket 172 and side bracket 174. The light emitted from the LEDs is diffused by a plastic rod diffuser 176. Referring to FIG. 10, a cross-sectional view of a conventional CIS module is shown. In accordance with the present invention, the transparency adapter magnet 134 and the CIS scanner magnet 138 are affixed to an exterior surface of the conventional LED light source and to the outside of the conventional CIS module in a position so as to have the LED light source aligned with, that is directly above, the CIS module lens 178 when the magnet 134 is directly above the magnet 138. The magnets may be placed on the outside of the LED light source module and/or the CIS module, or on the inside of the modules, so long as the placement is such as to result in alignment as described above.

Figure 11:
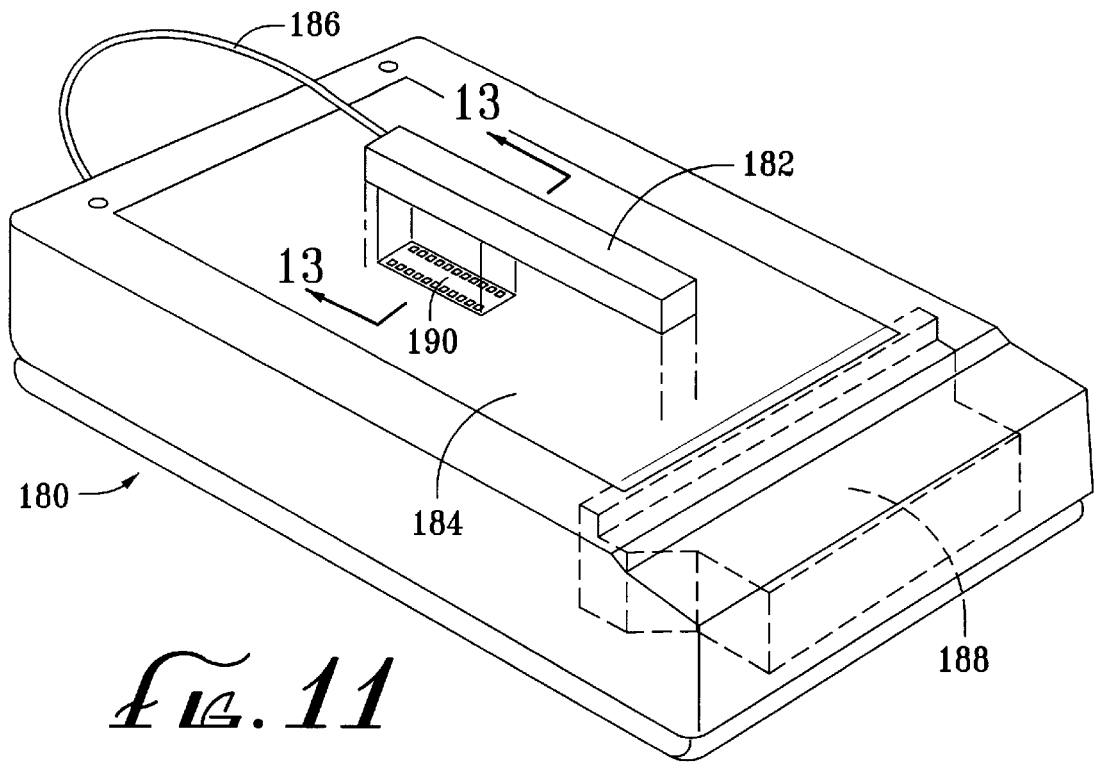
FIG. 11 is a front perspective view of an alternate embodiment of the present invention.
Figure 12:
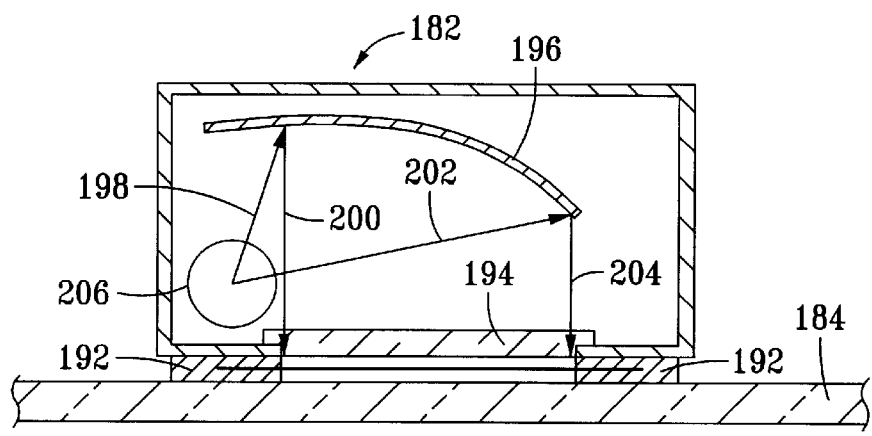
FIG. 12 is a cross-sectional view of the FIG. 11 embodiment taken along line 13—13, but with a mounted 35 mm slide.
Figure 13:
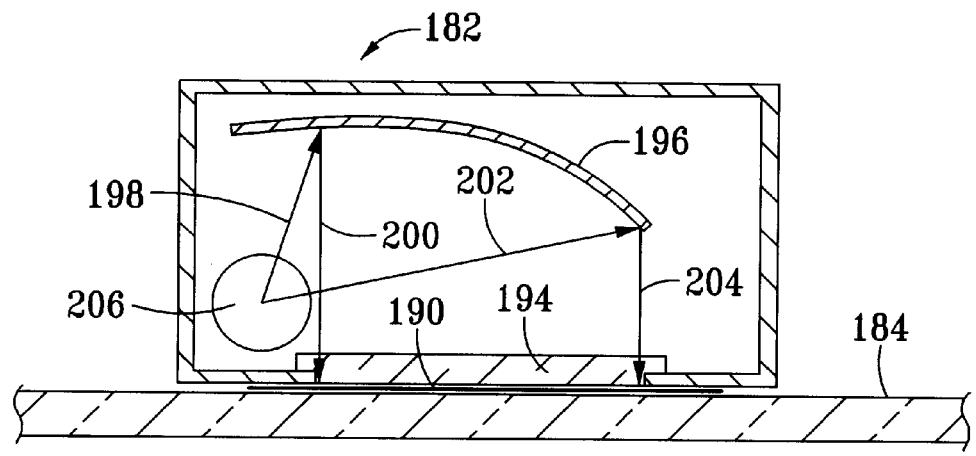
FIG. 13 is a cross-sectional view of the FIG. 11 embodiment taken along line 13—13.

Referring to FIGS. 11–13, a third alternate embodiment of the present invention will be described. Conventional flat bed scanner 180 is shown with transparency adapter 182 positioned over the glass platen 184 and powered through power cord 186 which is connected to the AC power supply at the end of the scanner housing. Shown in dotted lines is conventional carriage 188. Underneath adapter 182 is positioned a conventional strip of 35 mm transparency film. The transparency adapter of the FIG. 11 embodiment is like that described above with respect to the FIGS. 1–6 embodiment, except that it does not include magnets. Also, the carriage 188 does not include magnets. It is intended that the embodiment of FIGS. 11–13 be a relatively low cost, simple transparency adapter configured for a sole use, that is, scanning a length of 35 mm transparency film, either in a film strip format 190, as shown in FIG. 11, or with a plurality of the 35 mm slides, each mounted on a mounting board 192 as shown in FIG. 12.

The light source for the transparency adapter 182 is a conventional tube, or fluorescent bulb which produces white light. Once the light has been energized in the transparency adapter 182, the scanner is simply operated in its normal way, with the carriage 188 moving from one end of the scanner to the other. The light source will direct light through the transparency 190, through the platen and conventional mirrors and lenses found in the carriage 188, and to the color CCD mounted in the carriage, for conversion of the image into a series of digital signals which may then be processed by a computer. In the embodiment of FIGS. 11–13, the diffuser is, preferably, of a width at least equal to the width of the transparency portion of the 35 mm film. As shown in FIGS. 12 and 13, the diffuser 194 receives reflected light from the reflector 196. The curvature of the reflector 196 is chosen so as to provide the same path length from the longitudinal centerline of the light source to all points along the surface of the diffuser 194. For example, referring to the path of light represented by arrows 198 and 200, the length of these two arrows, i.e. the distance of travel of light from the center of the light source 206 is the same as the path of light from the center of the light source to the opposite edge of the diffuser 194, as shown by arrows 202 and 204.

Comparing FIG. 12 and FIG. 13, FIG. 13 shows the transparency adapter 182 lying directly over a film strip 190. FIG. 12, on the other hand, shows the transparency adapter 182 lying over a conventionally mounted 35 mm transparency 206, with the mounting 192 shown in cross-section. The length of the transparency adapter 182 may be chosen to accommodate several transparencies in a film strip 190, or be longer to accommodate a length of film equal to the length of the platen 184 or to be of any intermediate length. The width of the transparency adapter 182, of course, may vary, but preferably is a width which corresponds to the length dimension of a 35 mm transparency.

Figure 14:
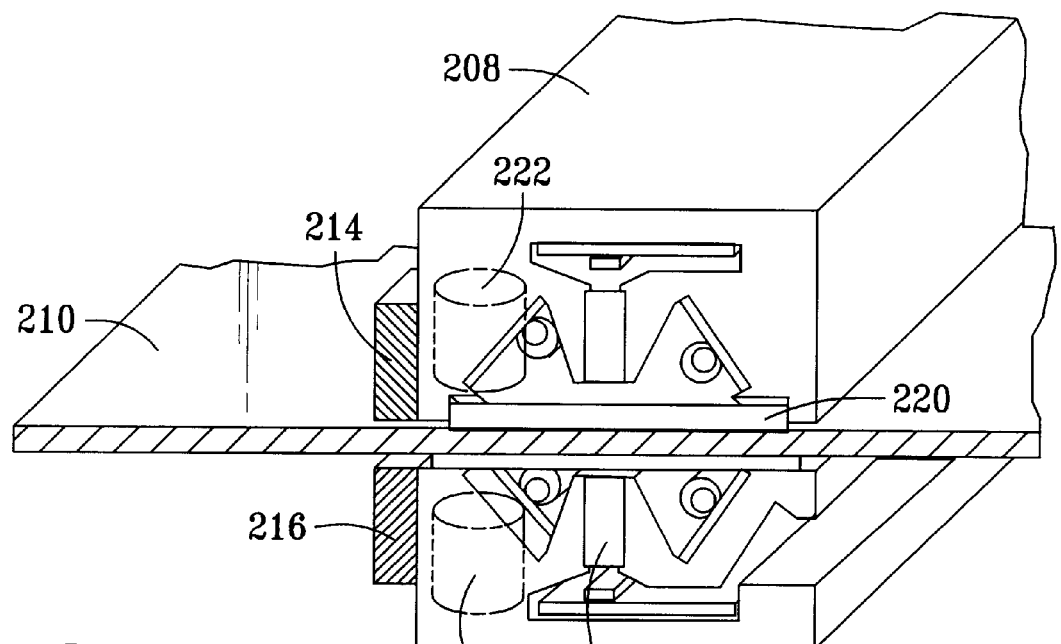
FIG. 14 is a cross-sectional view of an alternate embodiment of the present invention in which a contact image sensor is incorporated into the transparency adapter.

Referring to FIG. 14, another alternate embodiment of the present invention is shown wherein a transparency adapter 208 is shown positioned on top of a glass platen 210 of a CIS type flat bed scanner. Positioned underneath the glass platen is a CIS module 212. Attached to the transparency adapter 208 is a magnet 214 and attached to CIS module 212 is another magnet 216. The magnets 214 and 216 are positioned on the transparency adapter 208 and the CIS module 212 so as to provide alignment of the light source in the transparency adapter 208 with the lens 218 of the CIS module 212. It is noted that the transparency adapter 208 of FIG. 14 is simply a conventional CIS module which is oriented so its glass surface 220 faces and is adjacent to platen 210. As such, the CIS module is used simply as a source of light in this position, and its associated lens and sensor is not used. Also, pads having a slippery or sliding surface are, preferably, placed on each longitudinal end of the CIS module to provide a smooth, sliding surface for the adapter 208 to slide across the glass platen 210 in accordance with and following the movement of the CIS module 212 located within the scanner housing. In FIG. 14, these pads are not shown. Also, it is preferred that the magnets 214 and 216 be affixed to the outside of the CIS modules; however, magnets may, optionally be placed inside of the modules, so long as the magnets do not interfere with operation of the CIS modules. Shown in dotted lines are such optional, internal magnets 222 and 224.

It will be understood that certain features and sub-combinations are of utility and may be employed without reference to other features and sub-combinations as they are outlined within the description above and within the claims appended hereto. While the preferred embodiments and application of the invention have been described, it is apparent to those skilled in the art that the objects and features of the present invention are only limited as set forth in the claims appended hereto.

I claim:

1. A transparency adapter in combination with a flat bed scanner including a housing, a platen, a carriage positioned within said housing, a light receiving aperture in said carriage and a control system, comprising:

an adapter housing;

a light source including at least one adapter magnet, said light source positioned on said adapter housing; and at least one carriage magnet attached to said carriage in a position such that when said carriage magnet is aligned with said adapter magnet, the light source is aligned with said aperture, and when said carriage is moved during operation of the scanner, the adapter housing moves along the top of the platen and above the carriage through magnetic attractive force.

2. The transparency adapter of claim 1 further including a first pad positioned at a first longitudinal end of said adapter and a second pad positioned at a second longitudinal end of said adapter.

3. The transparency adapter of claim 1 wherein the light source is a white light source.

4. The transparency adapter of claim 1, wherein said scanner is a contact image sensor scanner, and the light source includes at least one red, one green and one blue light emitting diode.

5. The transparency adapter of claim 1, wherein said scanner is a contact image sensor scanner, and the adapter light source is a contact image sensor module.

6. A transparency adapter in combination with a flat bed scanner including a housing, a transmissive scanning platform, a carriage adapted for reciprocal motion within said housing, a light receiving aperture in said carriage, a scanning camera positioned on said carriage and a control system, comprising:

an adapter housing adapted for placement on said transmissive scanning platform independent of motion of said carriage and having substantially the same length and width dimension as a 35 mm film strip, or a 35 mm slide, a diffuser positioned at one side of said adapter housing, and a light source positioned adjacent said diffuser and adapted to transmit light through said platform during scanning.

7. The transparency adapter of claim 6 further including a first pad positioned at a first longitudinal end of said adapter and a second pad positioned at a second longitudinal end of said adapter.

8. The transparency adapter of claim 6 wherein the light source is a white light source.

9. The transparency adapter of claim 6 wherein the light source includes at least one red, one green and one blue light emitting diode.

\* \* \* \* \*